United States Patent
Wittevrongel et al.

(10) Patent No.: US 10,855,743 B1
(45) Date of Patent: Dec. 1, 2020

(54) EFFICIENT VIDEO TRANSFER SYSTEM

(71) Applicant: Lytx, Inc., San Diego, CA (US)

(72) Inventors: Jeremiah Todd Wittevrongel, San Diego, CA (US); Stephen Krotosky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 84 days.

(21) Appl. No.: 16/240,566

(22) Filed: Jan. 4, 2019

(51) Int. Cl.
*G06F 15/16* (2006.01)
*H04L 29/08* (2006.01)
*H04L 12/14* (2006.01)

(52) U.S. Cl.
CPC .......... *H04L 67/04* (2013.01); *H04L 12/1439* (2013.01); *H04L 67/22* (2013.01); *H04L 67/325* (2013.01)

(58) Field of Classification Search
CPC ....... H04L 67/04; H04L 67/22; H04L 67/325; H04L 12/1439
USPC ........................................................ 709/217
See application file for complete search history.

(56) References Cited

U.S. PATENT DOCUMENTS

| | | | |
|---|---|---|---|
| 2012/0324466 A1* | 12/2012 | He .............................. | G06F 9/50 718/104 |
| 2015/0163320 A1* | 6/2015 | Hu ........................ | G06Q 10/101 709/214 |
| 2015/0195214 A1* | 7/2015 | Sugiyama ............. | H04L 41/145 709/226 |
| 2016/0360286 A1* | 12/2016 | Shenkler .......... | H04N 21/25866 |
| 2017/0046269 A1* | 2/2017 | Bhattacharyya ........ | H04L 67/22 |
| 2019/0109926 A1* | 4/2019 | Hotchkies ............. | H04L 67/327 |

* cited by examiner

*Primary Examiner* — Alicia Baturay
*Assistant Examiner* — Joseph R Maniwang
(74) *Attorney, Agent, or Firm* — Van Pelt, Yi & James LLP (57) ABSTRACT

A system for marking and transferring data of interest includes an interface and a processor. The interface is configured to receive an indication to mark data of interest. The processor is configured to: determine whether to generate a transfer request for the data of interest based at least in part on a viewing likelihood estimate, and in response to a determination to generate the transfer request for the data of interest, generate the transfer request for the data of interest.

26 Claims, 10 Drawing Sheets

EFFICIENT VIDEO TRANSFER SYSTEM

BACKGROUND OF THE INVENTION

A monitoring system collects data using a remote device and uses the data to monitor the environment of the remote device. Data is collected using a data collection system including one or more sensors and stored on the remote device. A determination is made of one or more data regions of interest (e.g., by analyzing data, by receiving an indication of a region of interest, etc.). Data regions of interest comprise data regions determined to include data requiring further analysis. Data regions of interest are transferred to a database system for viewing and/or analysis by a database user. For example, when a database user using a database system desires to access a data region, the database user provides an indication to the database system. The data region is retrieved from the remote device and stored on the database system, and an indication of access to the data region is provided to the database user. Transferring data only when it is desired for viewing creates a problem wherein the data is transferred at a time when data transfer costs are high (e.g., during business hours). Data transfer costs are reduced at off-peak times (e.g., overnight).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for marking and transferring data of interest comprises an interface and a processor. The interface is configured to receive an indication to mark data of interest. The processor is configured to determine whether to generate a transfer request for the data of interest based at least in part on a viewing likelihood estimate, and in response to a determination to generate the transfer request for the data of interest, generate the transfer request for the data of interest. The system additionally comprises a memory coupled to the processor and configured to provide the processor with instructions.

An efficient video transfer system comprises a system for marking data of interest and transferring the data of interest from a remote device to a database system ahead of when it will be desired for viewing. When the system receives an indication to download a data region from a remote device to a database system, the system utilizes a view likelihood model trained on historical data viewing patterns to determine a view likelihood function describing the likelihood of the data being viewed as time progresses into the future. The soonest time that the view likelihood crosses a viewing likelihood threshold is determined as the time budget for the data (e.g., the amount of time available to transfer the data before it is required). In response to a determination that the time budget is less than a time budget threshold (e.g., it is needed soon), a transfer request for the data is provided to the remote device indicating to transfer the data. The transfer request includes a transfer deadline indicating when the data is required to be received by the database system. The remote device receives the transfer request and adds it to a transfer queue. Periodically, transfer requests in the transfer queue are analyzed to determine whether they should be fulfilled. Analyzing a transfer request comprises determining a transfer budget function for the transfer request, wherein the transfer budget function is based at least in part on the network cost, the availability of local compute resources and the power budget. A set of heuristics is then used to determine whether to fulfill the transfer request or wait until a later transfer period. A user is additionally able to provide an indication to the database system to download the data region immediately. The request is immediately passed on to the remote system and fulfilled.

View metric data is stored by the database system. View metric data comprises data describing when a transferred data region was viewed, whether a transferred data region was viewed, whether a user requested immediate download of a data region previously marked for download, etc. The view metric data is used to improve the view likelihood model.

The efficient video transfer system improves the computing system by utilizing a view prediction model to determine the most likely time requested data will be accessed. The system is then to download the data at a time that minimizes resource (e.g., storage) usage without reducing availability to the data when it is required. The system improves usage of the network and makes the transmission efficient and optimizes a user experience in being able to access desired data in the time frame typically desired.

Figure 1:
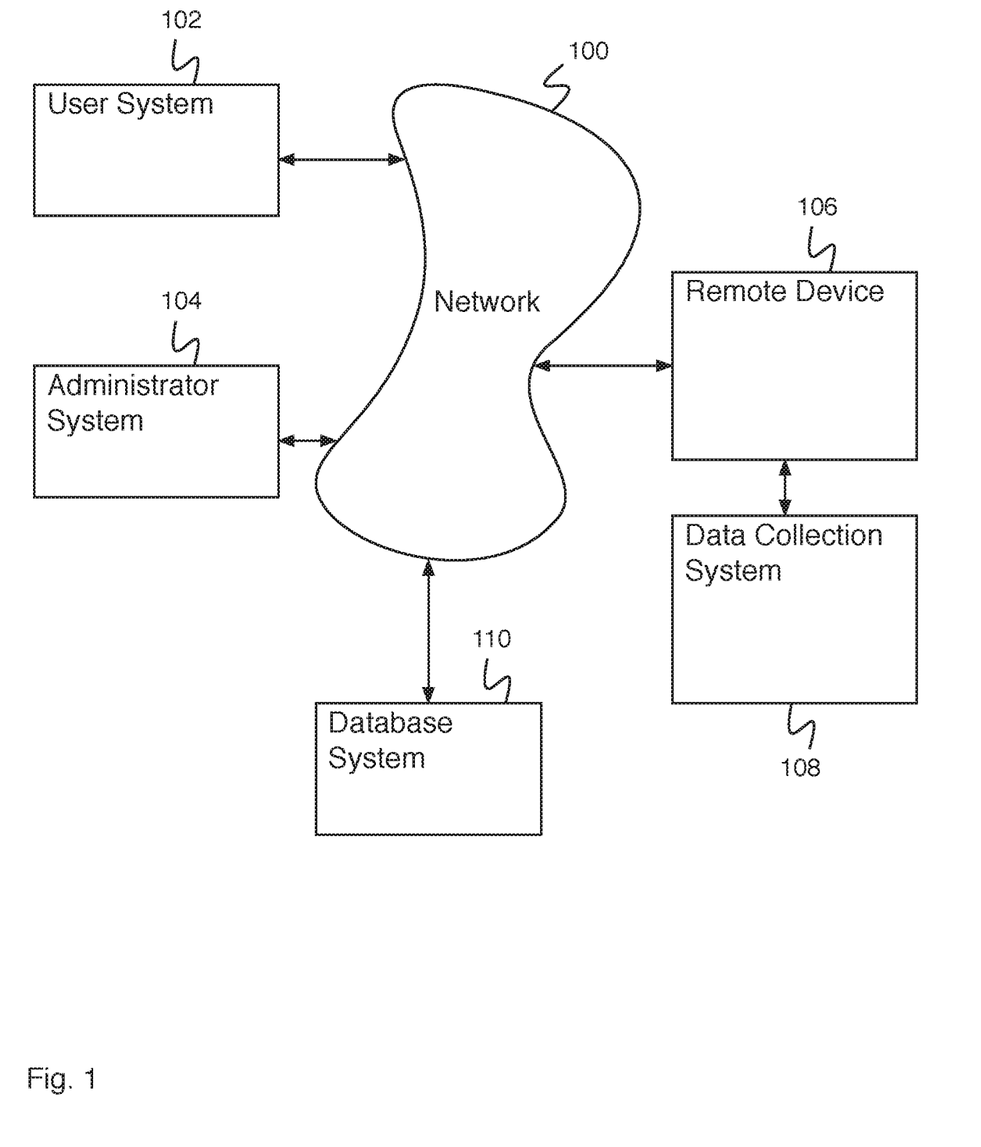
FIG. 1 is a block diagram illustrating an embodiment of a network system.

FIG. 1 is a block diagram illustrating an embodiment of a network system. In some embodiments, the network system of FIG. 1 comprises a network system for an efficient video transfer system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, administrator system 104, remote device 106, and database system 110 communicate via network 100. Remote device 106 is coupled to data collection system 108 for collecting data. For example, data collection system 108 comprises a data collection system for collecting one or more of: video data, image data, audio data, accelerometer data, gyroscope data, global positioning system (e.g., GPS) data, temperature data, laser line tracker data, vehicle state sensor data (e.g., engine data, vehicle control data, driver or passenger weight sensor data, anti-locking brake data, etc.), etc.

User system 102 comprises a user system for use by a user. A user uses user system 102 to interact with database system 110, for example to store database data, to request database data, to create a report based on database data, to create a document, to access a document, to execute a database application, etc. Administrator system 104 comprises an administrator system for use by an administrator—for example, for executing administrator commands, for configuring database system 110, for administrating remote device 106, etc. Database system 110 comprises a database system for storing data, providing data for access, organizing data, processing data, etc. Database system 110 comprises a system for storing data captured by data collection system 108 and transferred via remote device 106. Database system 110 comprises a database server system, a distributed database system, a cloud database system, etc. For example, database system 110 comprises a system for requesting data transfer from remote device 106 and receiving transferred data. For example, database system 110 comprises a system configured to receive an indication to mark data of interest, determine whether to generate a transfer request for the data of interest based at least in part on a viewing likelihood estimate, and in response to a determination to generate the transfer request for the data of interest, generate the transfer request for the data of interest.

Figure 2:
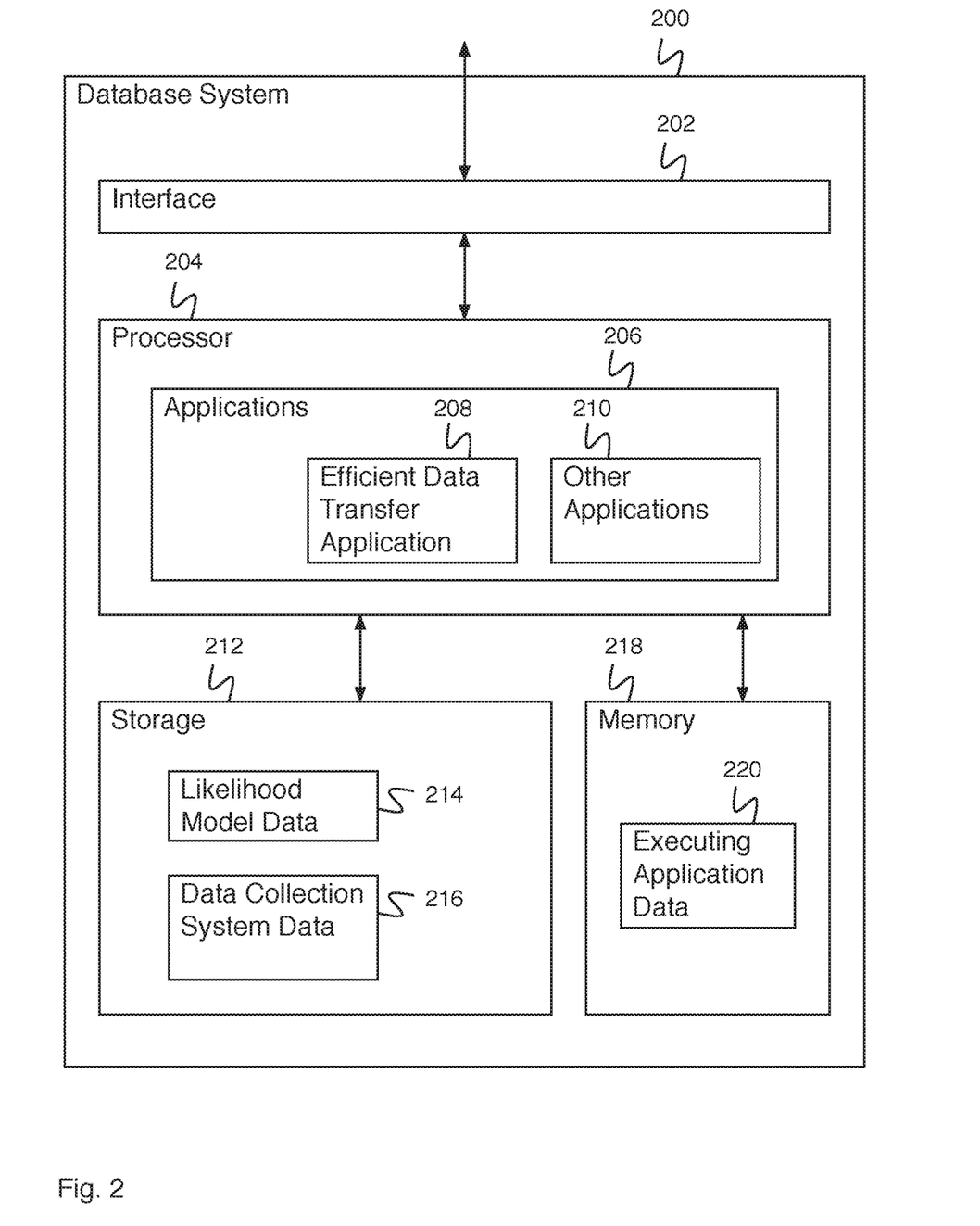
FIG. 2 is a block diagram illustrating an embodiment of a database system.

FIG. 2 is a block diagram illustrating an embodiment of a database system. In some embodiments, database system 200 comprises database system 110 of FIG. 1. In the example shown, database system 200 comprises interface 202. Interface 202 comprises an interface for communicating with external systems using a network. For example, interface 202 comprises an interface for communicating with a user system (e.g., for receiving a request to access shared services, for providing a user interface, for receiving a selection of a shared service, etc.), an administrator system, a remote device, etc. Processor 204 comprises a processor for executing applications 206. Applications 206 comprises efficient data transfer application 208 and other applications 210. For example, efficient data transfer application 208 receives an indication to mark data of interest, determines whether to generate a transfer request for the data of interest based at least in part on a viewing likelihood estimate, and in response to a determination to generate the transfer request for the data of interest, generates the transfer request for the data of interest. Other applications 210 comprises any other appropriate applications (e.g., a communications application, a chat application, a web browser application, a document preparation application, a data storage and retrieval application, a user interface application, a data analysis application, etc.). Database system 200 additionally comprises storage 212. Storage 212 comprises likelihood model data 214 (e.g., comprising a model, models, model data, etc. for determining a user likelihood of viewing data) and data collection system data 216 (e.g., comprising data captured by a data collection system). Database system 200 additionally comprises memory 218. Memory 218 comprises executing application data 220 comprising data associated with applications 206.

Figure 3:
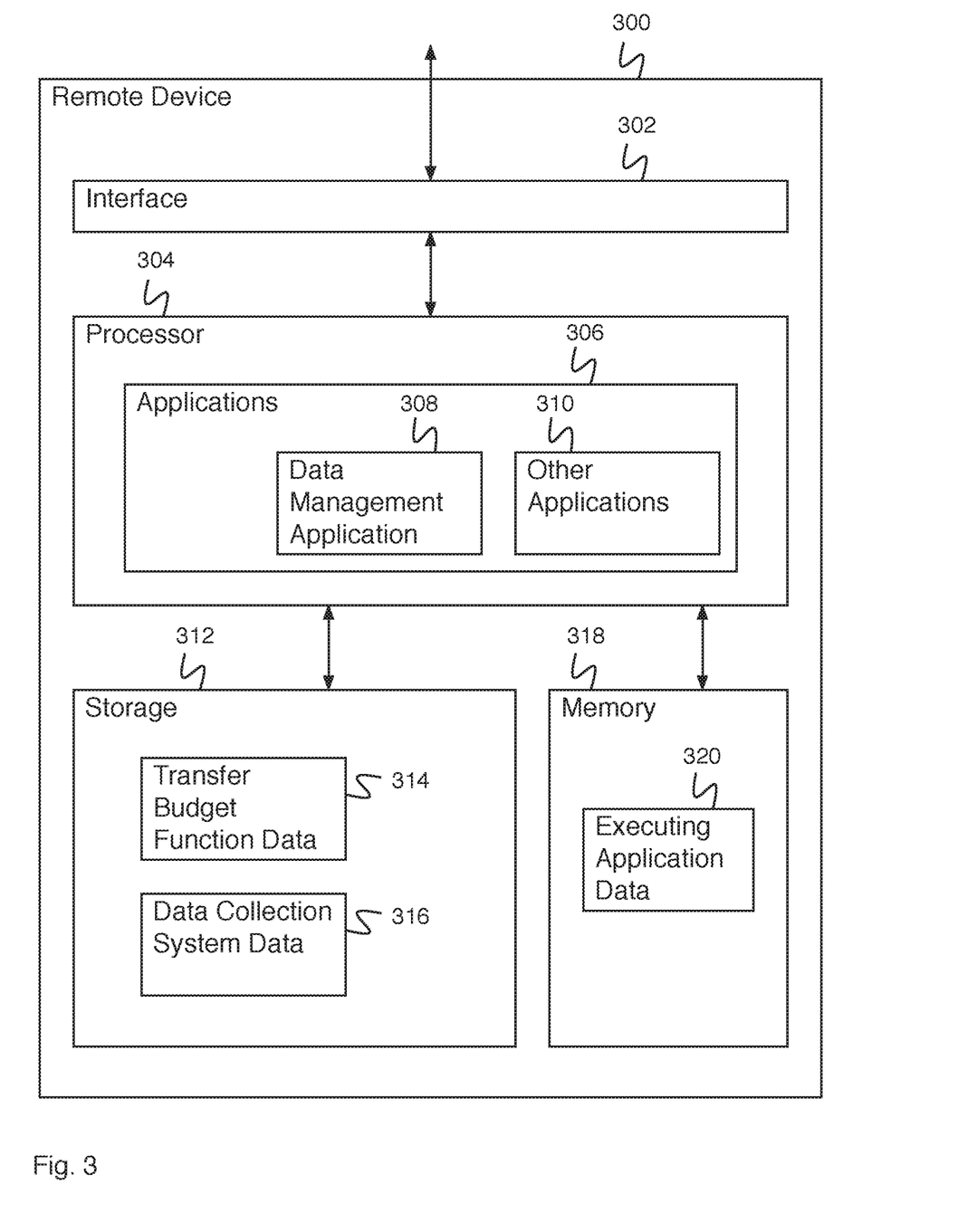
FIG. 3 is a block diagram illustrating an embodiment of a remote device.

FIG. 3 is a block diagram illustrating an embodiment of a remote device. In some embodiments, remote device 300 comprises remote device 106 of FIG. 1. In the example shown, remote device 300 comprises interface 302. Interface 302 comprises an interface for communicating with external systems. For example, interface 302 comprises an interface for communicating with a user system (e.g., via a network), a data collection system (e.g., via a wired connection, via a local wireless connection, via a network, etc.), etc. Processor 304 comprises a processor for executing applications 306. Applications 306 comprises efficient data management application 308 and other applications 310. For example, data management application 308 receives a transfer request for data of interest, adds the transfer request to a transfer request queue, determines a transfer budget function for the transfer request, determines whether transfer policies indicate to fulfill the transfer request, and in response to a determination that the transfer policies indicate to fulfill the transfer request, fulfills the transfer request. Other applications 310 comprises any other appropriate applications (e.g., a communications application, a chat application, a data processing application, a GPS navigation application, a data storage and retrieval application, a user interface application, a data analysis application, etc.). Database system 300 additionally comprises storage 312. Storage 312 comprises transfer budget function data 314 (e.g., comprising data for determining a transfer budget function for a transfer request) and data collection system data 316 (e.g., comprising data captured by a data collection system). Database system 300 additionally comprises memory 318. Memory 318 comprises executing application data 320 comprising data associated with applications 306.

Figure 4:
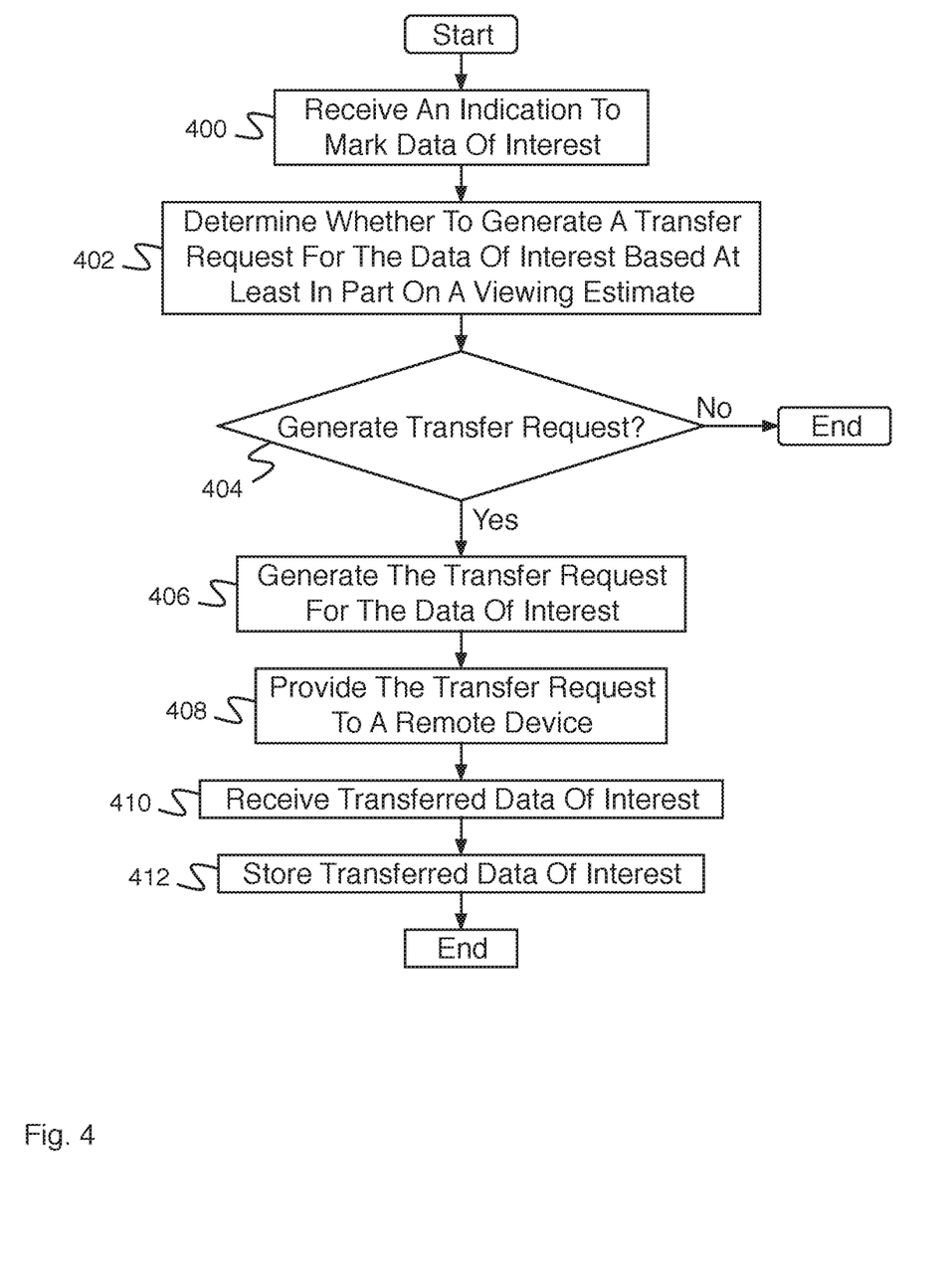
FIG. 4 is a flow diagram illustrating an embodiment of a process for an efficient video transfer system.

FIG. 4 is a flow diagram illustrating an embodiment of a process for an efficient video transfer system. In some embodiments, the process of FIG. 4 is executed by database system 110 of FIG. 1. In the example shown, in 400, an indication is received to mark data of interest. For example, an indication to mark data of interest comprises an indication that a data region is of interest, an indication that a data region should be downloaded, an indication that a data region is desired to be viewed, etc. Data of interest comprises video data, image data, audio data, accelerometer data, gyroscope data, global positioning system (GPS) data, temperature data, laser line tracker data, vehicle state sensor data, etc. For some cases, the indication is received via an application programming interface (API) call—for example, triggered by a user indication to a user interface, a command line interface, etc. In 402, the process determines whether to generate a transfer request for the data of interest based at least in part on a viewing estimate. For example, the determination of whether to generate a transfer request for the data of interest is based at least in part on data view metrics, a cost saving metric, a view likelihood model, a view likelihood estimate, historic marked data, metadata associated with the data, vehicle data, group data, fleet data, tenant data, company data, driver data, etc. In 404, in the event it is determined not to generate the transfer request, the process ends. In the event it is determined to generate the transfer request, control passes to 406. In 406, the transfer request is generated for the data of interest. In 408, the transfer request is provided to a remote device. In 410, transferred data of interest is received (e.g., in response to the remote device fulfilling the transfer request). In some embodiments, a data of interest transfer time is determined and the data of interest transfer time is provide to a transfer time estimator for determining an estimate of transfer time. In 412, transferred data of interest is stored.

Figure 5:
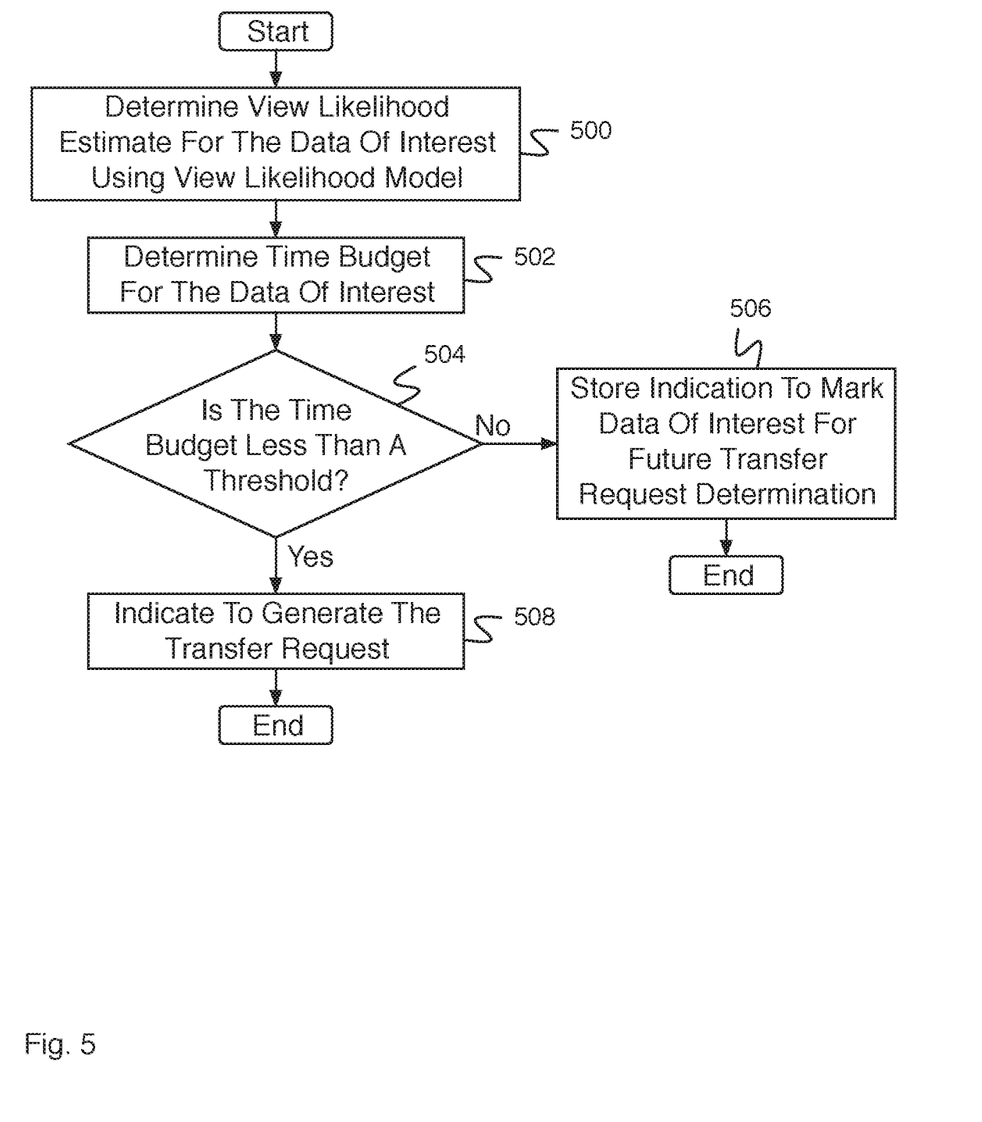
FIG. 5 is a flow diagram illustrating an embodiment of a process for determining whether to generate a transfer request.

FIG. 5 is a flow diagram illustrating an embodiment of a process for determining whether to generate a transfer request. In some embodiments, the process of FIG. 5 implements 402 of FIG. 4. In the example shown, in 500, a view likelihood is estimated for the data of interest using a view likelihood model. In 502, a time budget for the data of interest is determined. For example, a time budget is determined by determining the time that the view likelihood estimate for the data of interest crosses a viewing likelihood threshold. In 504, it is determined whether the time budget is less than a time budget threshold (e.g., whether the time budget determined in 502 is less than a time budget threshold, e.g., whether the time until the viewing likelihood crosses a likelihood threshold is sooner than a time threshold).

In some embodiments, a determination that the time budget is less than a time budget threshold comprises a determination that enough time or enough budget are available for a transfer request. For example, a determination that enough time is available for a transfer request comprises a determination that an estimate of transfer time is less than the time available until the transfer deadline. A determination that enough budget is available for a transfer request comprises a determination that an estimate of transfer cost is less than the budget available for transfer.

In the event it is determined that the time budget is not less than a time budget threshold, control passes to 506. In 506, an indication is stored to mark data of interest for future transfer request determination (e.g., it is determined whether to generate a transfer request for the data of interest again at a future time). The process then ends. In the event it is determined in 504 that the time budget is less than a time budget threshold, control passes to 508. In 508, the process indicates to generate the transfer request.

Figure 6:
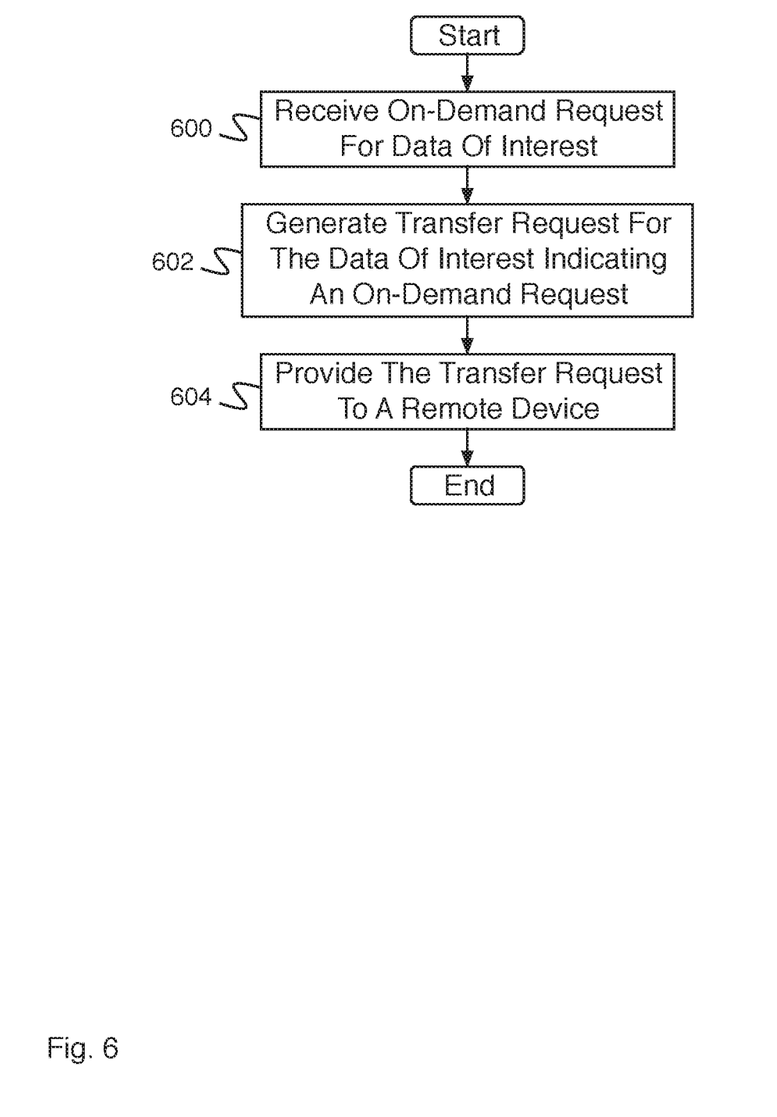
FIG. 6 is a flow diagram illustrating an embodiment of a process for responding to an on-demand request for data of interest.

FIG. 6 is a flow diagram illustrating an embodiment of a process for responding to an on-demand request for data of interest. In some embodiments, the process of FIG. 6 is executed by database system 110 of FIG. 1. In the example shown, in 600, an on-demand request for data of interest is determined. In 602, a transfer request is generated for the data of interest indicating an on-demand request. In 604, the transfer request is provided to a remote device.

Figure 7:
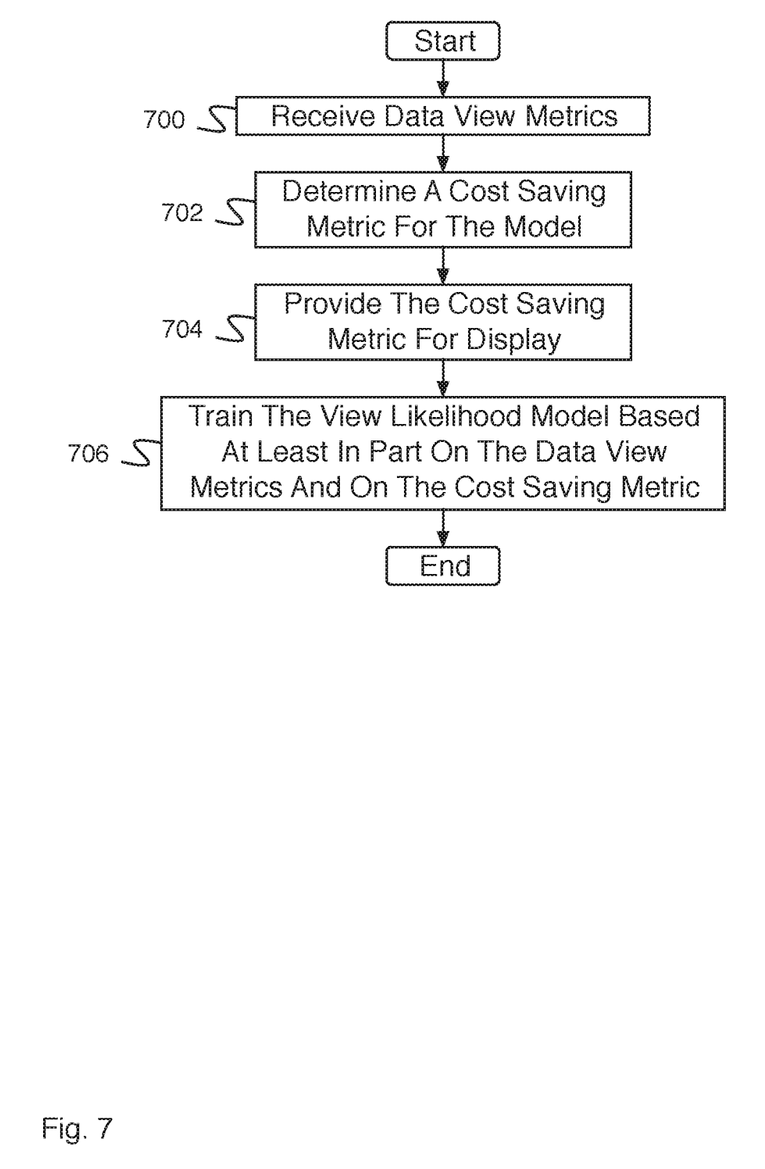
FIG. 7 is a flow diagram illustrating an embodiment of a process for training a view likelihood model.

FIG. 7 is a flow diagram illustrating an embodiment of a process for training a view likelihood model. In some embodiments, the process of FIG. 7 is executed by database system 110 of FIG. 1. In the example shown, in 700, data view metrics are received. For example, data view metrics comprise data describing whether historic data of interest was later viewed without having been transferred as a result of a transfer request generated in response to a view likelihood estimate (e.g., whether historic data of interest was viewed after having been transferred in response to an on-demand transfer request), data describing whether historic data of interest was transferred as a result of the transfer request and not viewed, data describing whether historic data of interest was viewed, data describing when historic data of interest was viewed, etc. In 702, a cost saving metric for the model is determined. For example, a cost saving metric for the model comprises a metric for the cost savings achieved by using the view likelihood model to determine when to transfer data marked as data of interest as compared with transferring data marked as data of interest immediately (e.g., treating all indications to mark data of interest as on-demand requests). In 704, the cost-saving metric is provided for display. In 706, the view likelihood model is trained based at least in part on the data view metrics and on the cost saving metric.

Figure 8:
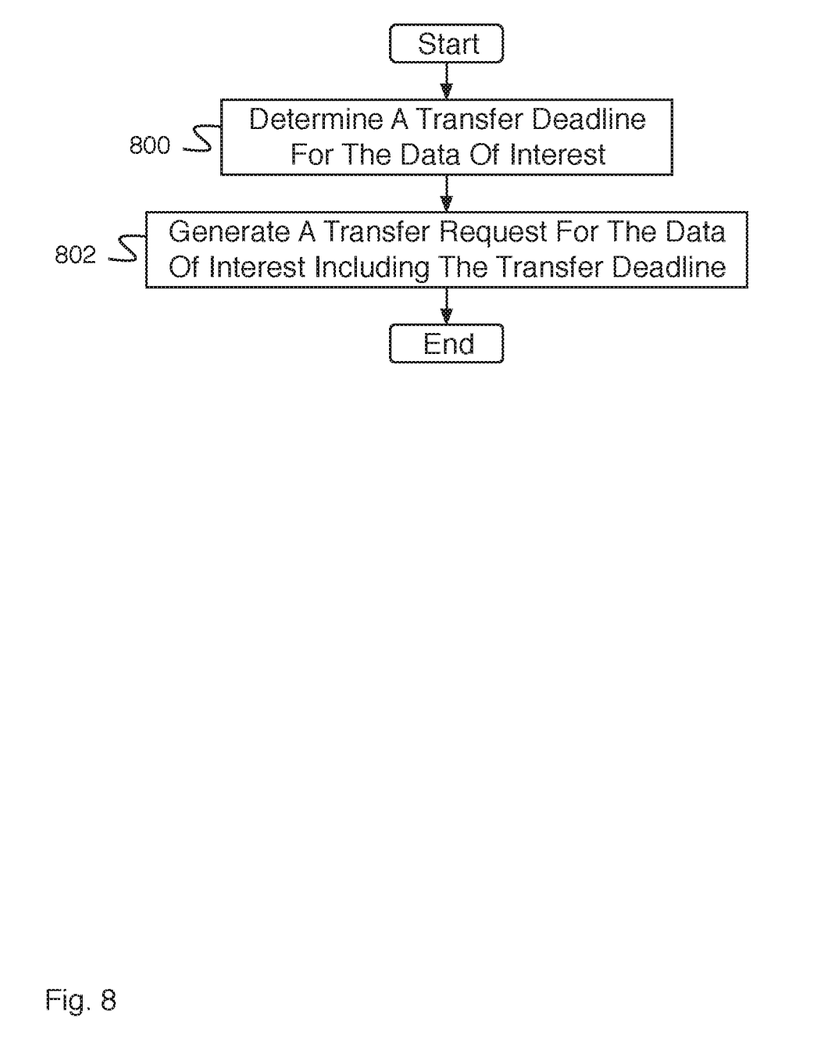
FIG. 8 is a flow diagram illustrating an embodiment of a process for generating a transfer request for data of interest.

FIG. 8 is a flow diagram illustrating an embodiment of a process for generating a transfer request for data of interest. In some embodiments, the process of FIG. 8 implements 406 of FIG. 4. In the example shown, in 800, a transfer deadline for the data of interest is determined. For example, the transfer deadline comprises a time when a view likelihood estimate crosses a viewing likelihood threshold. In some embodiments, the transfer deadline includes an estimate of transfer time (e.g., the transfer deadline is determined to be sooner than it otherwise would be by an amount equal to an estimate of the transfer time for the data of interest). In 802, a transfer request for the data of interest including the transfer deadline is generated.

Figure 9:
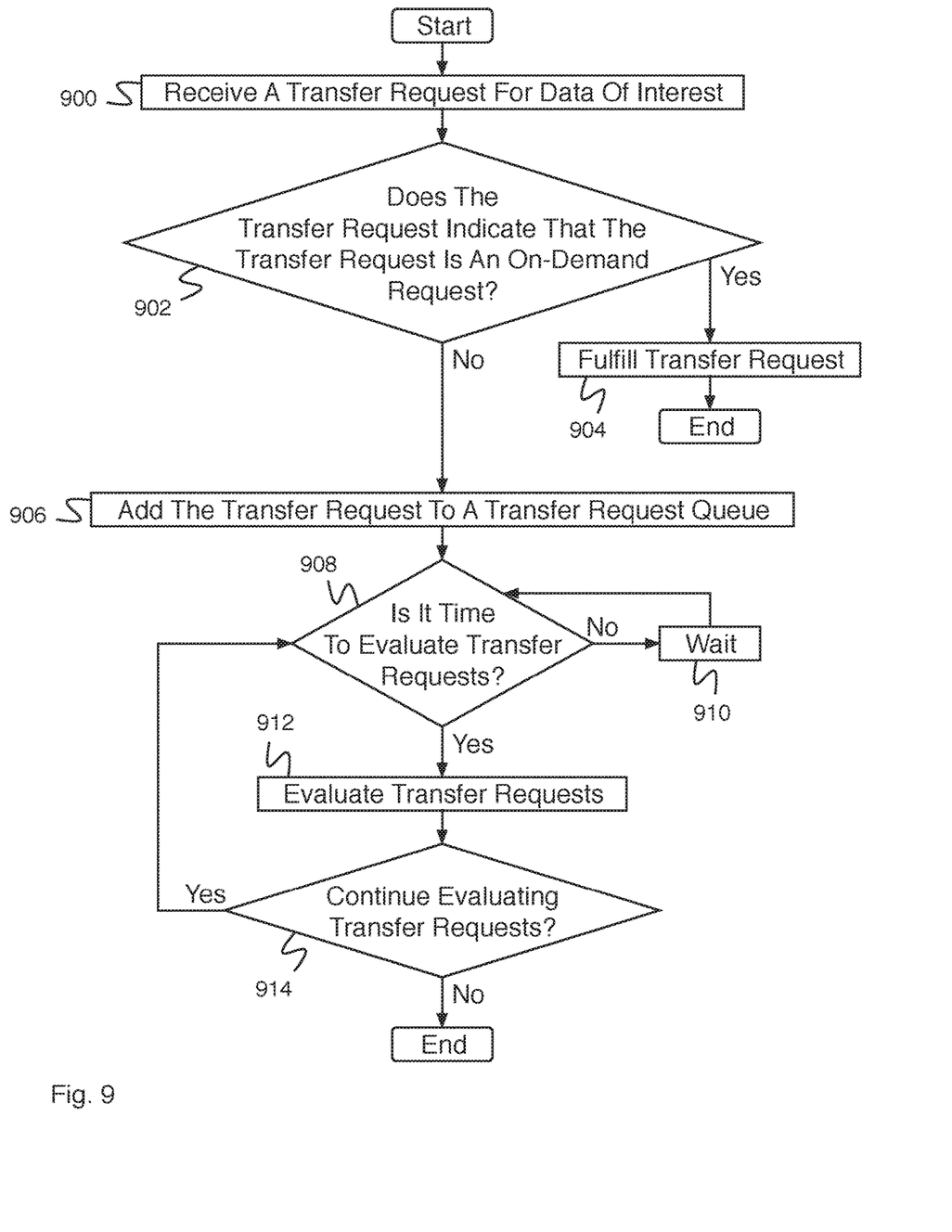
FIG. 9 is a flow diagram illustrating an embodiment of a process for responding to a transfer request.

FIG. 9 is a flow diagram illustrating an embodiment of a process for responding to a transfer request. In some embodiments, the process of FIG. 9 is executed by a remote device (e.g., remote device 106 of FIG. 1). In the example shown, in 900, a transfer request is received for a data of interest. For example, the transfer request comprises a deadline (e.g., a time by which the data of interest is required to be transferred) or the transfer request comprises an indication that the transfer request comprises an on-demand request (e.g., an indication that the data is required to be transferred as soon as possible). In 902, it is determined whether the transfer request indicates that the transfer request is an on-demand request. In the event it is determined that the transfer request indicates that the transfer request is an on-demand request, control passes to 904. In 904, the transfer request is fulfilled, and the process ends. In the event it is determined in 902 that the transfer request is not an on-demand request, control passes to 906. In 906, the transfer request is added to a transfer request queue. In 908, it is determined whether it is time to evaluate transfer requests. For example, transfer requests are evaluated periodically or on a periodic basis—for example, every 30 seconds, every few minutes, randomly, etc. In the event it is determined that it is not time to evaluate transfer requests, control passes to 910. In 910, the process waits. For example, the process waits 1 second, 5 seconds, 30 seconds, 1 minute, a random amount of time, etc. Control then passes to 908. In the event it is determined in 908 that it is time to evaluate transfer requests, control passes to 912. In 912, transfer requests are evaluated. For example, transfer requests are evaluated to determine whether they should be fulfilled (e.g., whether the data of interest in the transfer requests should be transferred). In 914, it is determined whether to continue evaluating transfer requests. In the event it is determined to continue evaluating transfer requests, control passes to 908. In the event it is determined not to continue evaluating transfer requests, the process ends.

Figure 10:
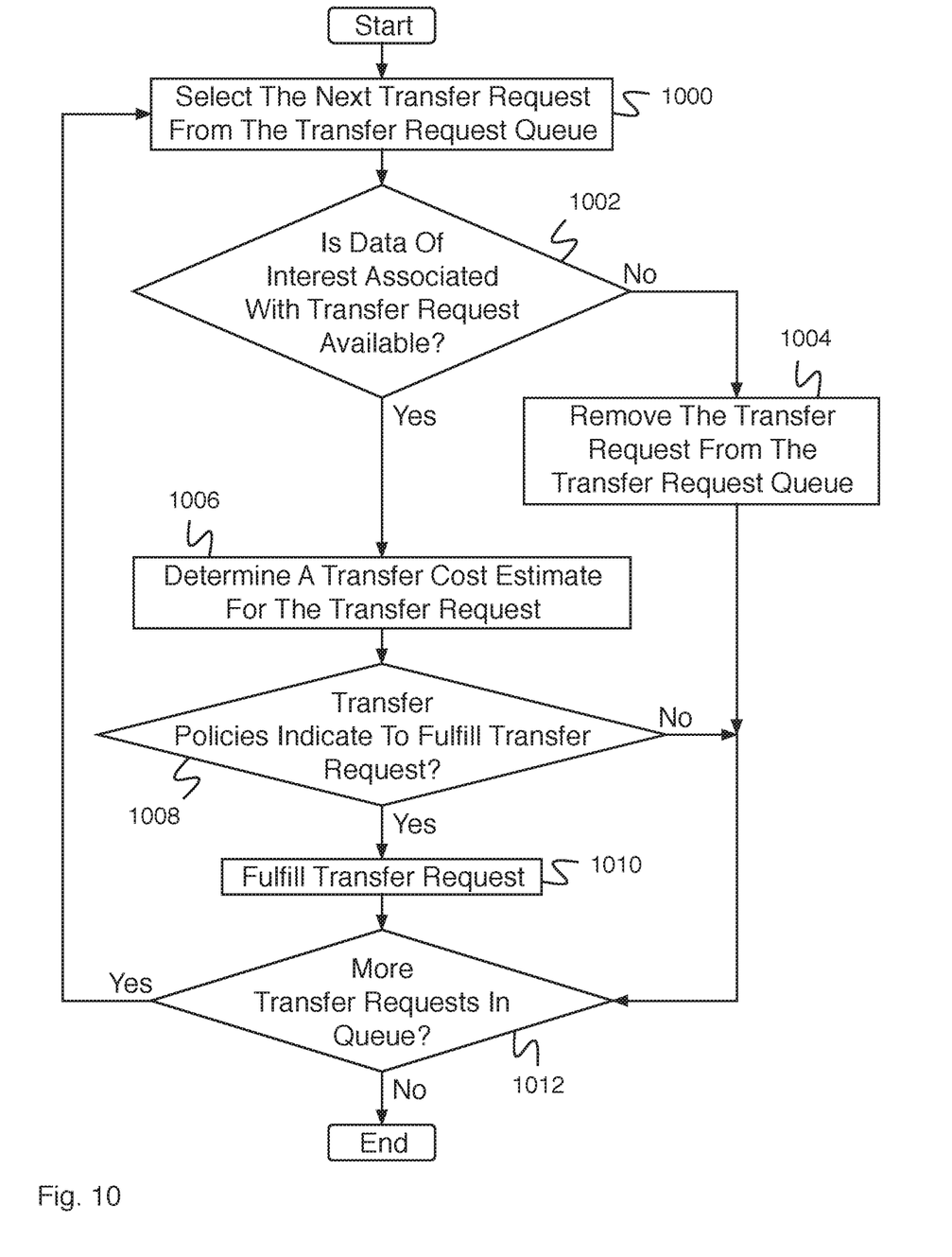
FIG. 10 is a flow diagram illustrating an embodiment of a process for evaluating transfer requests.

FIG. 10 is a flow diagram illustrating an embodiment of a process for evaluating transfer requests. In some embodiments, the process of FIG. 10 implements 912 of FIG. 9. In the example shown, in 1000, the next transfer request is selected from the transfer request queue. In some embodiments, the next transfer request comprises the first transfer request (e.g., the first transfer request in the queue). For example, transfer requests in the queue are ordered according to an associated deadline time, are ordered oldest to newest, are ordered according to an estimated transfer budget function, etc. In 1002, it is determined whether data of interest associated with the transfer request is available. For example, it is determined whether data of interest has already been deleted (e.g., because it is too old). In the event it is determined that data of interest associated with the transfer request is not available, control passes to 1004. In 1004, the transfer request is removed from the transfer request queue. Control then passes to 1012. In the event it is determined in 1002 that data of interest associated with the transfer request is available, control passes to 1006. In 1006, a transfer cost estimate is determined for the transfer request. A transfer cost estimate is determined using a transfer budget function.

For example, a transfer budget function determination is based at least in part on a network cost, on computer resources, and on a power budget. In 1008, it is determined whether transfer policies indicate to fulfill the transfer request. For example, transfer policies indicate whether to fulfill a transfer request based on a determined transfer cost estimate fraction of a total available transfer budget, a fraction of time remaining until a transfer deadline, etc. For example, transfer policies indicate to fulfill the transfer request in response to a determination that a transfer request cost estimate is less than a first transfer request cost threshold fraction of an available transfer budget, in response to a determination that a transfer request cost estimate is less than a second transfer request cost threshold fraction of an available transfer budget and the remaining time until a transfer deadline is less than a deadline threshold time, or in response to a determination that a transfer request time estimate is less than a transfer request time threshold fraction of the remaining time until a transfer deadline.

In the event it is determined that transfer policies do not indicate to fulfill the transfer request, control passes to 1012. In the event it is determined that transfer policies indicate to fulfill the transfer request, control passes to 1010. In 1010, the transfer request is fulfilled (e.g., the data of interest is transferred). In 1012, it is determined whether there are more transfer requests in the queue. In the event it is determined that there are more transfer requests in the queue, control passes to 1000. In the event it is determined that there are not more transfer requests in the queue, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for marking and transferring data of interest, comprising:
   an interface configured to:
      receive an indication to mark data of interest; and
   a processor configured to:
      determine whether to generate a transfer request for the data of interest based at least in part on a viewing likelihood estimate; and
      in response to a transfer request determination to generate the transfer request for the data of interest, generate the transfer request for the data of interest, wherein the transfer request is generated in response to determining that the viewing likelihood estimate crosses a viewing likelihood threshold sooner than a time budget threshold.

2. The system of claim 1, wherein the data of interest comprises video data.

3. The system of claim 1, wherein the indication is received via an API call.

4. The system of claim 1, wherein the transfer request determination of whether to generate the transfer request is additionally based at least in part on one or more of the following: historic marked data, metadata associated with the data of interest, vehicle data, group data, fleet data, tenant data, company data, or driver data.

5. The system of claim 1, wherein the interface is further configured to receive data view metrics.

6. The system of claim 1, wherein the transfer request determination of whether to generate the transfer request is based at least in part on a view likelihood model.

7. The system of claim 6, wherein the view likelihood model is trained on whether historic data of interest was later viewed without having been transferred resulting from the transfer request generated in response to the view likelihood estimate, on whether historic data of interest was transferred resulting from the transfer request and not viewed, on when historic data of interest was viewed, and/or on a cost saving metric for the view likelihood model.

8. The system of claim 1, wherein the processor is further configured to determine a cost saving metric for a view likelihood model and provide the cost saving metric for the view likelihood model for display.

9. The system of claim 1, wherein the transfer request includes a transfer deadline.

10. The system of claim 9, wherein the transfer deadline comprises a time when the viewing likelihood estimate crosses a viewing likelihood threshold.

11. The system of claim 9, wherein the transfer deadline includes an estimate of transfer time.

12. The system of claim 11, wherein a data of interest transfer time is provided to a transfer time estimator for determining the estimate of transfer time.

13. The system of claim 1, wherein generating the transfer request comprises determining that enough time or enough budget are available for a transfer request.

14. The system of claim 13, wherein determining that enough time is available for the transfer request comprises determining that an estimate of a transfer time is less than a time available until a transfer deadline and/or wherein determining that enough of a budget is available for the transfer request comprises determining that an estimate of transfer cost is less than the budget available for transfer.

15. The system of claim 1, wherein the processor is further configured to provide the transfer request to a device.

16. The system of claim 15, wherein the device adds the transfer request to a transfer request queue.

17. The system of claim 16, wherein the device removes the transfer request from the transfer request queue in response to determining that the data of interest associated with the transfer request is not available, and/or the device evaluates requests in the transfer request queue on a periodic basis.

18. The system of claim 16, wherein the transfer request queue is ordered oldest to newest.

19. The system of claim 15, wherein the device determines a transfer cost estimate based at least in part on a network cost, on computer resources, and on a power budget.

20. The system of claim 1, wherein fulfilling the transfer request comprises transferring the data of interest.

21. The system of claim 1, wherein the indication to mark data of interest includes a deadline.

22. A system for marking and transferring data of interest, comprising:
an interface configured to:
receive an indication to mark data of interest; and
a processor configured to:
determine whether to generate a transfer request for the data of interest based at least in part on a viewing likelihood estimate;
in response to a transfer request determination to generate the transfer request for the data of interest, generate the transfer request for the data of interest; and
provide the transfer request to a device, wherein the device fulfills the transfer request in response to determining that a transfer request cost estimate is less than a first transfer request cost threshold fraction of an available transfer budget, in response to determining that a transfer request cost estimate is less than a second transfer request cost threshold fraction of an available transfer budget and a remaining time until a transfer deadline is less than a deadline threshold time, and/or in response to determining that a transfer request time estimate is less than a transfer request time threshold fraction of a remaining time until a transfer deadline.

23. A method for marking and transferring data of interest, comprising:
receiving an indication to mark data of interest;
determining, using a processor, whether to generate a transfer request for the data of interest based at least in part on a viewing likelihood estimate; and
in response to a transfer request determination to generate the transfer request for the data of interest, generating the transfer request for the data of interest, wherein the transfer request is generated in response to determining that the viewing likelihood estimate crosses a viewing likelihood threshold sooner than a time budget threshold.

24. A computer program product for marking and transferring data of interest, the computer program product being embodied in a non-transitory computer readable storage medium and comprising computer instructions for:
receiving an indication to mark data of interest;
determining whether to generate a transfer request for the data of interest based at least in part on a viewing likelihood estimate; and
in response to a transfer request determination to generate the transfer request for the data of interest, generating the transfer request for the data of interest, wherein the transfer request is generated in response to determining that the viewing likelihood estimate crosses a viewing likelihood threshold sooner than a time budget threshold.

25. A method for marking and transferring data of interest, comprising:
receiving an indication to mark data of interest;
determining, using a processor, whether to generate a transfer request for the data of interest based at least in part on a viewing likelihood estimate;
in response to a transfer request determination to generate the transfer request for the data of interest, generating the transfer request for the data of interest; and
providing the transfer request to a device, wherein the device fulfills the transfer request in response to determining that a transfer request cost estimate is less than a first transfer request cost threshold fraction of an available transfer budget, in response to determining that a transfer request cost estimate is less than a second transfer request cost threshold fraction of an available transfer budget and a remaining time until a transfer deadline is less than a deadline threshold time, and/or in response to determining that a transfer request time estimate is less than a transfer request time threshold fraction of a remaining time until a transfer deadline.

26. A computer program product for marking and transferring data of interest, the computer program product being embodied in a non-transitory computer readable storage medium and comprising computer instructions for:
receiving an indication to mark data of interest;
determining whether to generate a transfer request for the data of interest based at least in part on a viewing likelihood estimate;
in response to a transfer request determination to generate the transfer request for the data of interest, generating the transfer request for the data of interest; and
providing the transfer request to a device, wherein the device fulfills the transfer request in response to determining that a transfer request cost estimate is less than a first transfer request cost threshold fraction of an available transfer budget, in response to determining that a transfer request cost estimate is less than a second transfer request cost threshold fraction of an available transfer budget and a remaining time until a transfer deadline is less than a deadline threshold time, and/or in response to determining that a transfer request time estimate is less than a transfer request time threshold fraction of a remaining time until a transfer deadline.

* * * * *